(12) United States Patent
Shin et al.

(10) Patent No.: US 12,175,678 B2
(45) Date of Patent: Dec. 24, 2024

(54) IMAGE PROCESSING APPARATUS AND OPERATING METHOD THEREOF

(71) Applicant: SAMSUNG ELECTRONICS CO., LTD., Suwon-si (KR)

(72) Inventors: Hanul Shin, Suwon-si (KR); Soomin Kang, Suwon-si (KR); Jaeyeon Park, Suwon-si (KR); Youngchan Song, Suwon-si (KR); Iljun Ahn, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 17/749,602

(22) Filed: May 20, 2022

(65) Prior Publication Data

US 2022/0375093 A1  Nov. 24, 2022

Related U.S. Application Data

(63) Continuation of application No. PCT/KR2022/006494, filed on May 6, 2022.

(30) Foreign Application Priority Data

May 20, 2021 (KR) .................. 10-2021-0065089
Jan. 24, 2022 (KR) .................. 10-2022-0010225

(51) Int. Cl.
*G06T 7/12* (2017.01)
*G06T 5/50* (2006.01)
(Continued)

(52) U.S. Cl.
CPC .................. *G06T 7/12* (2017.01); *G06T 5/50* (2013.01); *G06V 10/44* (2022.01); *G06V 10/54* (2022.01)

(58) Field of Classification Search
None
See application file for complete search history.

(56) References Cited

U.S. PATENT DOCUMENTS 8,532,198 B2  9/2013  Kumwilaisak et al.
8,576,263 B2  11/2013  Correa et al.
(Continued)

FOREIGN PATENT DOCUMENTS

CN  102413271 A  4/2012
KR  10-1303667 B1  9/2013
(Continued)

OTHER PUBLICATIONS

Q. Huang, H. Y. Kim, W.-J. Tsai, S. Y. Jeong, J. S. Choi and C . . . -C. J. Kuo, "Understanding and Removal of False Contour in HEVC Compressed Images," in IEEE Transactions on Circuits and Systems for Video Technology, vol. 28, No. 2, pp. 378-391, Feb. 2018, doi: 10.1109/TCSVT.2016.2607258 (Year: 2018).*

(Continued)

*Primary Examiner* — Vu Le
*Assistant Examiner* — Charles C L Penny
(74) *Attorney, Agent, or Firm* — Sughrue Mion, PLLC

(57) ABSTRACT

An image processing apparatus, including a memory configured to store one or more instructions; and at least one processor configured to execute the one or more instructions to: based on a first image and a probability model, optimize an estimated pixel value and estimated gradient values of each pixel of an original image corresponding to the first image, obtain an estimated original image based on the optimized estimated pixel value of the each pixel of the original image, obtain a decontour map based on the optimized estimated pixel value and the estimated gradient values of the each pixel of the original image, and generate (Continued)

a second image by combining the first image with the estimated original image based on the decontour map.

20 Claims, 12 Drawing Sheets

(51) Int. Cl.
*G06V 10/44* (2022.01)
*G06V 10/54* (2022.01)

(56) References Cited

U.S. PATENT DOCUMENTS

| | | | |
|---|---|---|---|
| 8,855,213 | B2 | 10/2014 | Filippini et al. |
| 9,019,327 | B2 | 4/2015 | Kawabe |
| 9,424,630 | B2 | 8/2016 | Lim et al. |
| 9,779,486 | B2 | 10/2017 | Yang et al. |
| 10,448,014 | B2 | 10/2019 | Possos et al. |
| 2015/0092847 | A1* | 4/2015 | Su .................... H04N 19/33 375/240.12 |
| 2016/0021391 | A1* | 1/2016 | Su .................... H04N 19/136 375/240.12 |
| 2017/0053176 | A1 | 2/2017 | Yang et al. |
| 2017/0208345 | A1 | 7/2017 | Jeong et al. |

FOREIGN PATENT DOCUMENTS

| | | |
|---|---|---|
| KR | 10-1369524 B1 | 3/2014 |
| KR | 10-2017-0087278 A | 7/2017 |

OTHER PUBLICATIONS

Ji Won Lee, Bo Ra Lim, Rae-Hong Park, Jae-Seung Kim and Wonseok Ahn, "Two-stage false contour detection using directional contrast and its application to adaptive false contour reduction," in IEEE Transactions on Consumer Electronics, vol. 52, pp. 179-188, Feb. 2006, doi: 10.1109/TCE.2006.1605045 (Year: 2006).*

Huang et al., "Understanding and Removal of False Contour in HEVC Compressed Images," IEEE Transactions on Circuits and Systems for Video Technology, vol. 28, No. 2, pp. 378-391, Feb. 2018.

Bhagavathy et al., "Multiscale Probabilistic Dithering for Suppressing Contour Artifacts in Digital Images," IEEE Transactions on Image Processing, vol. 18, No. 9, pp. 1936-1945, Sep. 2009.

Peng et al., "CNN-Based Suppression of False Contour and Color Distortion in Bit-Depth Enhancement", Sensors 2021, 21, 416. https://doi.org/10.3390/s21020416, (18 pages total).

International Search Report (PCT/ISA/210 and PCT/ISA/220) and Written Opinion (PCT/ISA/237) issued Aug. 9, 2022 by the International Searching Authority in International Application No. PCT/KR2022/006494.

Kim et al., "Removing False Contour Artifact for Bit-depth Expansion", IEIE Transactions on Smart Processing and Computing, Apr. 30, 2013, 5 total pages, XP093198206.

Mizuno et al., "Bit-depth expansion for noisy contour reduction in natural images", 2016 IEEE International Conference on Acoustics, Speech and Signal Processing (ICASSP), Mar. 20, 2016, pp. 1671-1675, doi:10.1109/ICASSP.2016.7471961, XP032900887.

Communication dated Sep. 10, 2024, issued by European Patent Center in European Patent Application No. 22804879.9.

* cited by examiner

IMAGE PROCESSING APPARATUS AND OPERATING METHOD THEREOF

CROSS-REFERENCE TO RELATED APPLICATION(S)

This application is a bypass continuation of International Application No. PCT/KR2022/006494, filed on May 6, 2022, which is based on and claims priority to Korean Patent Application No. 10-2021-0065089, filed on May 20, 2021, and Korean Patent Application No. 10-2022-0010225, filed on Jan. 24, 2022, in the Korean Intellectual Property Office, the disclosures of which are incorporated by reference herein in their entireties.

BACKGROUND

1. Field

Various embodiments of the disclosure relate to an image processing apparatus capable of improving image quality by using machine learning, and an operating method thereof.

2. Description of Related Art

As data traffic has increased in line with developments in computer technologies, artificial intelligence has become an important trend for leading future innovation. Artificial intelligence emulates human thinking, and thus, in effect, may be applied to all industrial fields without limitations. Examples of artificial intelligence technologies include pattern recognition, machine learning, an expert system, neural networks, natural language processing, etc.

Machine learning is a field of artificial intelligence which allows a machine (e.g., a computer) to learn from data by itself, to recognize patterns (e.g. regularities) in the data, and thus make a decision or determination even on information that is not present in the data, based on the recognized patterns. Types of machine learning include supervised learning, unsupervised learning, reinforcement learning, or the like.

Machine learning may be variously used in the image processing field, and, in particular, may be used in processes for improving image quality.

SUMMARY

Various embodiments of the disclosure may provide an image processing apparatus capable of removing a false contour included in an image by using machine learning based on a probability model, and an operating method of the image processing apparatus.

In accordance with an aspect of the disclosure, an image processing apparatus includes a memory configured to store one or more instructions; and at least one processor configured to execute the one or more instructions to: based on a first image and a probability model, optimize an estimated pixel value and estimated gradient values of each pixel of an original image corresponding to the first image, obtain an estimated original image based on the optimized estimated pixel value of the each pixel of the original image, obtain a decontour map based on the optimized estimated pixel value and the estimated gradient values of the each pixel of the original image, and generate a second image by combining the first image with the estimated original image based on the decontour map.

The first image may include a true contour which is included in the original image, and a false contour which is not included in the original image, and the second image may be an image from which the false contour is removed.

The at least one processor may be further configured to execute the one or more instructions to: obtain, based on the first image, initial values of the estimated pixel value and the estimated gradient values of the each pixel of the original image, and optimize the estimated pixel value and the estimated gradient values of the each pixel of the original image by updating the estimated pixel value and the estimated gradient values of the each pixel of the original image based on the probability model.

The probability model may be obtained by modeling a probability that a pixel value of each pixel included in a first region around a first pixel of the first image originates from a first pixel of the original image having the estimated pixel value and the estimated gradient values, and the at least one processor may be further configured to execute the one or more instructions to optimize the estimated pixel value and the estimated gradient values of the first pixel by updating the estimated pixel value and the estimated gradient values of the first pixel such that the probability increases.

The at least one processor may be further configured to execute the one or more instructions to: obtain pixel values of pixels included in a second region around the first pixel in the original image, based on the estimated pixel value and the estimated gradient values of the first pixel, and optimize the estimated pixel value and the estimated gradient values of the first pixel by updating the estimated pixel value and the estimated gradient values of the first pixel such that a loss function determined based on the probability is minimized, and the probability may be represented by a function of a difference between a pixel value of each pixel included in the second region and a pixel value of the each pixel included in the first region.

The at least one processor may be further configured to execute the one or more instructions to: obtain a texture map based on the first image and the estimated original image, obtain a curvature map based on the optimized estimated gradient values of the each pixel of the original image, and obtain the decontour map based on the texture map and the curvature map.

The at least one processor may be further configured to execute the one or more instructions to generate the texture map by obtaining a difference image between the first image and the estimated original image and performing filtering on the difference image.

The at least one processor may be further configured to execute the one or more instructions to obtain the curvature map by computing a curvature of each pixel of the estimated original image based on the optimized estimated gradient values of the each pixel of the original image.

The texture map may represent a first weight of the each pixel of the original image, wherein the curvature map represents a second weight of the each pixel of the original image, wherein the decontour map may represent a third weight of the each pixel of the original image, and the at least one processor may be further configured to execute the one or more instructions to obtain the third weight based on the first weight and the second weight of the each pixel of the original image.

The at least one processor may be further configured to execute the one or more instructions to: receive a third image including a frame image subsequent to the first image, obtain first estimated information including the estimated pixel value and the estimated gradient values of the each pixel of the original image, which are optimized and subsampled with respect to the first image, obtain second estimated information by subsampling initial values of an estimated pixel value and estimated gradient values of each pixel of the third image, obtain difference information between the first image and the third image, obtain third estimated information based on the first estimated information and the difference information, obtain fourth estimated information by combining the second estimated information with the third estimated information based on a first probability that the third image originates from the second estimated information and a second probability that the third image originates from the third estimated information, obtain fifth estimated information by performing optimization on the fourth estimated information based on the subsampled third image, and generate a fourth image from which a false contour of the third image is removed, based on an estimated pixel value and estimated gradient values included in the fifth estimated information.

The at least one processor may be further configured to execute the one or more instructions to: obtain a third probability that a false contour of the first image is included in each pixel of the first image, and obtain the fourth estimated information by combining the second estimated information and the third estimated information based on the first probability, the second probability, and the third probability.

The at least one processor may be further configured to execute the one or more instructions to: obtain an estimated original image of the third image by upscaling the estimated pixel value included in the fifth estimated information, obtain a texture map based on the third image and the estimated original image of the third image, obtain a curvature map based on the estimated gradient values included in the fifth estimated information, upscale the curvature map, generate a decontour map of the third image based on the texture map and the upscaled curvature map, and generate the fourth image based on the decontour map of the third image.

In accordance with an aspect of the disclosure, an operating method of an image processing apparatus includes, based on a first image and a probability model, optimizing an estimated pixel value and estimated gradient values of each pixel of an original image corresponding to the first image; obtaining an estimated original image based on the optimized estimated pixel value of the each pixel of the original image; obtaining a decontour map based on the optimized estimated pixel value and the estimated gradient values of the each pixel of the original image; and generating a second image by combining the first image with the estimated original image based on the decontour map.

The first image may include a true contour which is included in the original image, and a false contour which is not included in the original image, and the second image may be an image from which the false contour is removed.

The optimizing, based on the first image and the probability model, of the estimated pixel value and the estimated gradient values of the each pixel of the original image may include: obtaining, based on the first image, initial values of the estimated pixel value and the estimated gradient values of the each pixel of the original image; and optimizing the estimated pixel value and the estimated gradient values of the each pixel of the original image by updating the estimated pixel value and the estimated gradient values of the each pixel of the original image based on the probability model.

The probability model may be obtained by modeling a probability that a pixel value of each pixel included in a first region around a first pixel of the first image originates from a first pixel of the original image having the estimated pixel value and the estimated gradient values, and the optimizing of the estimated pixel value and the estimated gradient values of the each pixel of the original image may include optimizing the estimated pixel value and the estimated gradient values of the first pixel by updating the estimated pixel value and the estimated gradient values of the first pixel such that the probability increases.

The optimizing of the estimated pixel value and the estimated gradient values of the each pixel of the original image may include: obtaining pixel values of pixels included in a second region around the first pixel in the original image, based on the estimated pixel value and the estimated gradient values of the first pixel; and optimizing the estimated pixel value and the estimated gradient values of the first pixel by updating the estimated pixel value and the estimated gradient values of the first pixel such that a loss function determined based on the probability is minimized, and the probability may be represented by a function of a difference between a pixel value of each pixel included in the second region and a pixel value of the each pixel included in the first region.

The obtaining of the decontour map may include: obtaining a texture map based on the first image and the estimated original image; obtaining a curvature map based on the optimized estimated gradient values of the each pixel of the original image; and obtaining the decontour map based on the texture map and the curvature map.

The obtaining of the texture map may include: obtaining a difference image between the first image and the estimated original image; and generating the texture map by performing filtering on the difference image.

The obtaining of the curvature map may include obtaining the curvature map by computing a curvature of each pixel of the estimated original image based on the optimized estimated gradient values of the each pixel of the original image.

The texture map may represent a first weight of the each pixel of the original image, the curvature map may represent a second weight of the each pixel of the original image, the decontour map may represent a third weight of the each pixel of the original image, and the obtaining of the decontour map may include obtaining the third weight based on the first weight and the second weight of the each pixel of the original image.

The operating method may further include receiving a third image including a frame image subsequent to the first image; obtaining first estimated information including the estimated pixel value and the estimated gradient values of the each pixel of the original image, which are optimized and subsampled with respect to the first image; obtaining second estimated information by subsampling initial values of an estimated pixel value and estimated gradient values of each pixel of the third image; obtaining difference information between the first image and the third image; obtaining third estimated information based on the first estimated information and the difference information; obtaining fourth estimated information by combining the second estimated information with the third estimated information based on a first probability that the third image originates from the second estimated information and a second probability that the third image originates from the third estimated information; obtaining fifth estimated information by performing optimization on the fourth estimated information based on the subsampled third image; and generating a fourth image from which a false contour of the third image is removed, based on an estimated pixel value and estimated gradient values included in the fifth estimated information.

The operating method further may include obtaining a third probability that a false contour of the first image is included in each pixel of the first image, and the obtaining of the fourth estimated information may include obtaining the fourth estimated information by combining the second estimated information and the third estimated information based on the first probability, the second probability, and the third probability.

The generating of the fourth image from which the false contour of the third image is removed, based on the estimated pixel value and the estimated gradient values included in the fifth estimated information, may include: obtaining an estimated original image of the third image by upscaling the estimated pixel value included in the fifth estimated information; obtaining a texture map based on the third image and the estimated original image of the third image; obtaining a curvature map based on the estimated gradient values included in the fifth estimated information; upscaling the curvature map; generating a decontour map of the third image based on the texture map and the upscaled curvature map; and generating the fourth image based on the decontour map of the third image.

In accordance with an aspect of the disclosure, a non-transitory computer-readable recording medium is configured to store instructions which, when executed by at least one processor, cause the at least one processor to: based on a first image and a probability model, optimize an estimated pixel value and estimated gradient values of each pixel of an original image corresponding to the first image; obtain an estimated original image based on the optimized estimated pixel value of the each pixel of the original image; obtain a decontour map based on the optimized estimated pixel value and the estimated gradient values of the each pixel of the original image; and generate a second image by combining the first image with the estimated original image based on the decontour map.

In accordance with an aspect of the disclosure, an image processing apparatus includes a memory configured to store one or more instructions; and at least one processor configured to execute the one or more instructions to: based on a first image and a probability model, optimize an estimated pixel value and estimated gradient values of a pixel of an original image corresponding to the first image, obtain an estimated original image based on the optimized estimated pixel value of the pixel, obtain a decontour map based on the optimized estimated pixel value and the estimated gradient values of the pixel, and generate a second image by combining the first image with the estimated original image based on the decontour map.

The first image may include a true contour which is included in the original image, and a false contour which is not included in the original image, and the second image may include the true contour, and may not include the false contour.

An image processing apparatus according to an embodiment of the disclosure may remove a false contour included in an input image by using a probability model, thereby improving image quality.

A false contour removal process according to an embodiment of the disclosure may be applied to a real-time moving image, and the amount of computation may be reduced by reusing estimated values of a previous frame image to process a current frame image.

Also, the size of memory and the amount of computation may be reduced by using estimated values of a subsampled previous frame image.

DETAILED DESCRIPTION

Figure 1:
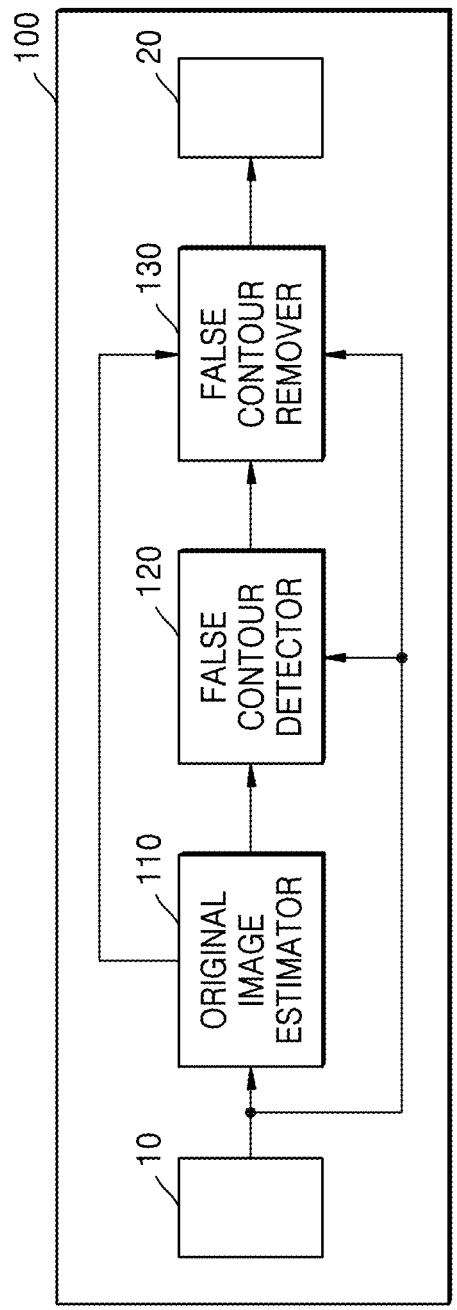
FIG. 1 is a diagram illustrating an operation, performed by an image processing apparatus, of processing an input image, according to an embodiment.

Throughout the disclosure, the expression "at least one of a, b or c" indicates only a, only b, only c, both a and b, both a and c, both b and c, all of a, b, and c, or variations thereof.

Examples of terms used herein will be briefly described, and then the disclosure will be described in detail.

Although terms used in the disclosure are selected from among common terms that are currently widely used in consideration of their functions in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used herein are not merely designations of the terms, but the terms are defined based on the meaning of the terms and content throughout the disclosure.

Throughout the disclosure, when a part "includes" a component, this may mean that the part may additionally include other components rather than excluding other components as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

Hereinafter, embodiments of the disclosure will be described in detail with reference to the accompanying drawings. The disclosure may, however, be embodied in many different forms and should not be construed as being limited to the embodiments of the disclosure set forth herein. In order to clearly describe the disclosure, portions that are not relevant to the description of the disclosure may be omitted, and similar reference numerals are assigned to similar elements throughout the specification.

FIG. 1 is a diagram illustrating an operation, performed by an image processing apparatus, of processing an input image, according to an embodiment of the disclosure.

Referring to FIG. 1, the image processing apparatus 100 according to an embodiment of the disclosure may receive a first image 10 and process the first image 10 to generate a second image 20. In embodiments, the first image 10 may include a false contour. A false contour is not an actual contour of an object included in an image, but is a contour that is not present in an original image but is generated in the image due to quantization. For example, when quantization is performed in a process of encoding an original image, a false contour may be included in an image obtained by decoding the encoded image. Such false contours are highly visible and thus have a large influence on the image quality, and accordingly, a process of removing the false contours may be desired. In addition, a false contour may appear similar to a texture in an image, and thus, it is necessary to process the false contour differently from a texture region.

The image processing apparatus 100 may include an original image estimator 110, a false contour detector 120, and a false contour remover 130, and the original image estimator 110 may obtain estimated information regarding the original image of the first image 10, based on the first image 10 and a probability model. For example, the estimated information regarding the original image may include an estimated pixel value, an estimated x-direction gradient value, which may be for example a first estimated gradient value, and an estimated y-direction gradient value, which may be for example a second estimated gradient value, of each pixel included in the original image. An example of a method, performed by the original image estimator 110, of obtaining estimated information regarding an original image will be described in detail with reference to FIGS. 2 to 5.

Also, the false contour detector 120 may detect a false contour based on the first image 10 and the estimated information regarding the original image obtained by the original image estimator 110. For example, the false contour detector 120 may obtain an estimated image of the original image, which may be referred to for example as an estimated original image, and detect a false contour based on a difference between the first image 10 and the estimated original image. In embodiments, the false contour detector 120 may detect the degree of curve of a region included in the image based on the estimated information regarding the original image, and detect a false contour based on the degree of curve of the region. Here, the detected false contour may be represented by a decontour map. An example of a method, performed by the false contour detector 120, of detecting a false contour will be described in detail with reference to FIGS. 6 and 7.

The false contour remover 130 may perform decontouring to remove the false contour included in the first image 10 by using the decontour map obtained by the false contour detector 120. The false contour remover 130 may generate the second image 20 by combining the estimated original image obtained by the original image estimator 110 with the first image 10. Here, the generated second image 20 may include only true contours, and may have a higher image quality than that of the first image 10.

An example of a method, performed by the false contour remover 130, of removing a false contour will be described in detail with reference to FIG. 8.

Figure 2:
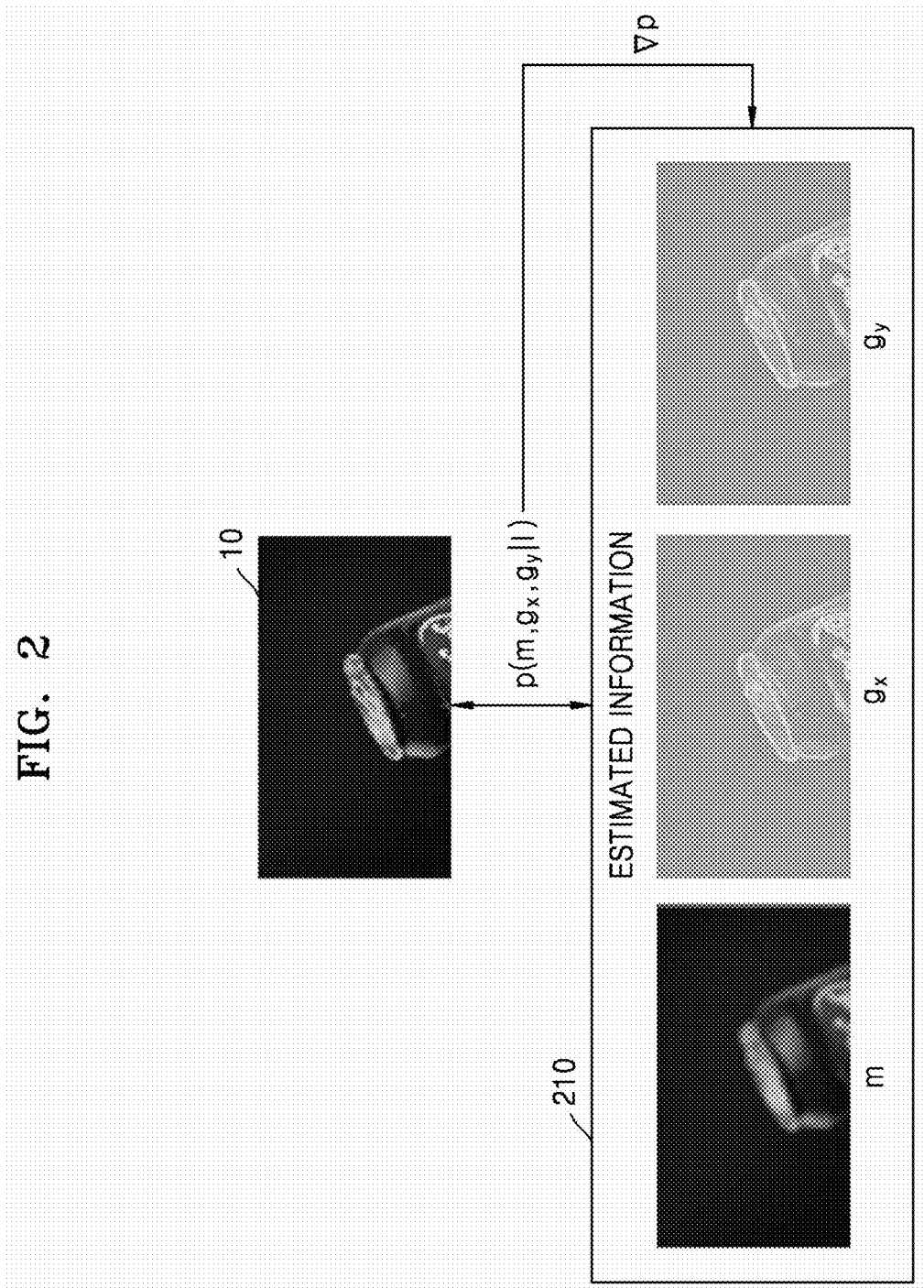
FIG. 2 is a diagram for describing a method, performed by an original image estimator, of obtaining estimated information regarding an original image, according to an embodiment.

FIG. 2 is a diagram for describing a method, performed by an original image estimator, of obtaining estimated information regarding an original image, according to an embodiment of the disclosure.

According to an embodiment of the disclosure, the original image estimator 110 may obtain estimated information regarding the original image of the first image 10 (i.e., an input image). According to an embodiment of the disclosure, estimated information 210 regarding an original image may include an estimated pixel value m, an x-direction gradient value $g_x$, and a y-direction gradient value $g_y$ of each pixel included in the original image.

The original image estimator 110 may optimize the estimated information 210 regarding the original image of the first image 10, based on the first image 10 and a probability model. In embodiments, the probability model may be determined by Bayes' rule. Bayes' rule describes the relationship between a prior probability and a posterior probability, and may be represented by Equation 1.

$$P(A|B) \propto P(B|A)P(A) \quad \text{[Equation 1]}$$

In Equation 1, P(A) is a prior probability, and P(A|B) is a posterior probability. Here, A may denote the original image, and B may denote the first image 10 (i.e., an input image).

In the case where the intrinsic probability P(A) of the original image is fixed and the first image 10 is given, the probability P(A|B) of the original image being the original image of the first image 10 is proportional to the probability P(B|A) of the first image 10 originating from the original image. Accordingly, by estimating an original image having the highest probability of originating the first image 10, the original image having the highest probability with respect to the first image 10 may be inferred.

The original image estimator 110 may estimate an original image having the highest probability of originating the first image 10 by performing optimization on the probability model based on Bayes' rule.

For example, when the first image 10, which may be denoted as I, is given, a probability $p(m, g_x, g_y|I)$ of the original image, having the estimated information 210 is proportional to a probability $p(I|m, g_x, g_y)$ of the first image 10 originating from the original image having the estimated information 210, and the probability model according to an embodiment of the disclosure may be a model obtained by modeling the probability $p(I|m, g_x, g_y)$ of the first image 10 originating from the original image having the estimated information 210. The original image estimator 110 may obtain optimized values of the estimated information 210 by updating the estimated information 210 by using a derivative $\nabla p$ of the probability $p(I|m, g_x, g_y)$ such that the probability $p(I|m, g_x, g_y)$ has the maximum value.

The original image estimator 110 according to an embodiment of the disclosure may obtain optimized values of estimated information regarding each pixel included in an original image, and an example of a probability model obtained by modeling the probability $p(I|m, g_x, g_y)$ for each pixel will be described in detail with reference to FIG. 3.

Figure 3:
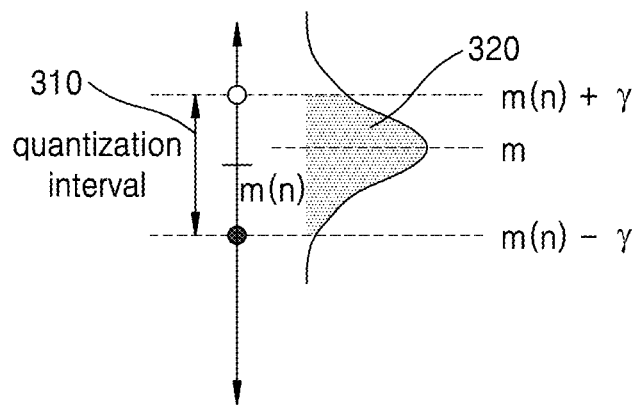
FIG. 3 is a diagram for describing a probability model for modeling a probability that a pixel value of a first image originates from a pixel value of an original image, according to an embodiment.

FIG. 3 is a diagram for describing a probability model for modeling a probability that a pixel value of a first image originates from a pixel value of an original image, according to an embodiment of the disclosure.

The first image 10 according to an embodiment of the disclosure may be an image obtained by performing quantization on the original image. Quantization is a process of mapping continuous values of a signal included in an original image to quantized values. Accordingly, as illustrated in FIG. 3, a range 310 of pixel values included in the original image may be estimated from a pixel value n of the first image 10.

In addition, when quantizing the original image, it may be assumed that not only a signal of the original image but also a value to which random noise is applied (i.e., signal of original image+random noise) is quantized to obtain the first image 10, and the random noise has a particular probability distribution. For example, when the random noise has a Gaussian distribution $N(0, \sigma^2)$ and a value obtained by dividing the size of the quantization interval by 2 is $\gamma$, a probability $P(I[x]=n|M(x)=m)$ of the pixel value n of the first image originating from a pixel value m of the original image may be represented by Equation 2.

$$P(I[x] = n|M(x) = m) = P(m(n) - \gamma \le m + \omega < m(n) + \gamma) =$$

$$\frac{1}{2}\left\{\Phi\left(\frac{m(n) - m + \gamma}{\sigma\sqrt{2}}\right) - \Phi\left(\frac{m(n) - m - \gamma}{\sigma\sqrt{2}}\right)\right\} =$$

$$\frac{1}{2}\left\{\Phi\left(\frac{\epsilon(n, m) + \gamma}{\sigma\sqrt{2}}\right) - \Phi\left(\frac{\epsilon(n, m) - \gamma}{\sigma\sqrt{2}}\right)\right\}$$

[Equation 2]

In addition, the probability $P(I[x]=n|M(x)=m)$ may represent the area of a first region 320 of FIG. 3, and the area of the first region 320 increases as the difference between the pixel value m of the original image and a median m(n) of the quantization interval decreases. Accordingly, as $\epsilon(n, m)$, which denotes the difference between the median m(n) and m, decreases, the probability that the pixel value n of the first image originates from the pixel value m of the original image increases. Also, referring to Equation 2, the probability $P(I[x]=n|M(x)=m)$ may be represented by a function of $\epsilon(n, m)$.

Figure 4:
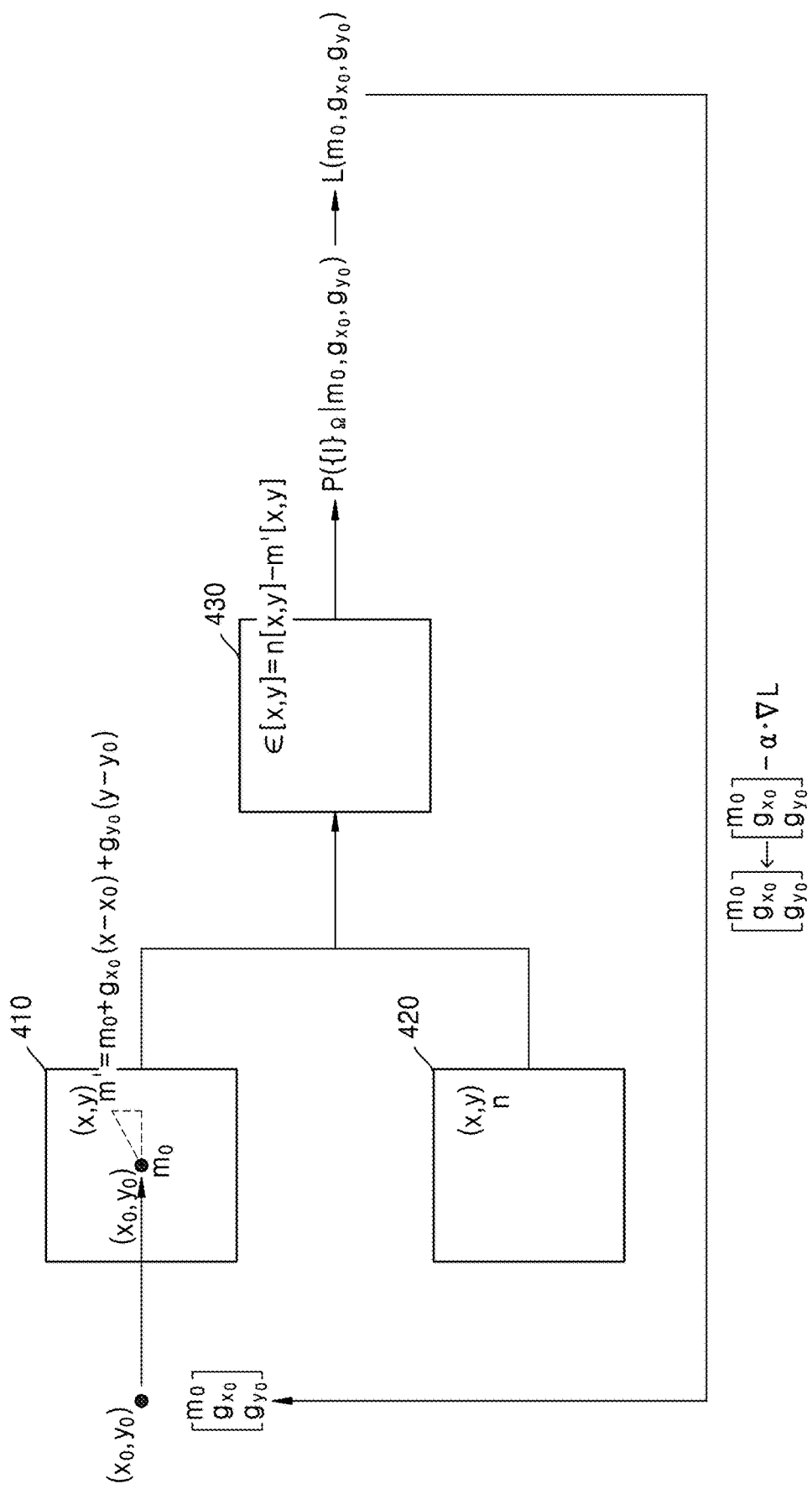
FIG. 4 is a diagram illustrating an operation of optimizing estimated information regarding an original image, according to an embodiment.

FIG. 4 is a diagram illustrating an operation of optimizing estimated information regarding an original image, according to an embodiment of the disclosure.

The original image estimator 110 according to an embodiment of the disclosure may perform optimization on an estimated pixel value, an estimated x-direction gradient value (i.e., a first estimated gradient value), and an estimated y-direction gradient value (i.e., a second estimated gradient value) of each pixel included in an original image, to obtain an optimized estimated pixel value, an optimized first estimated gradient value, and an optimized second estimated gradient value.

The original image estimator 110 may perform filtering on the first image 10 to obtain an initial values $m_0$ of the estimated pixel value, an initial value $g_{x0}$ of the first estimated gradient value, and an initial value $g_{y0}$ of the second estimated gradient value of each pixel included in the original image.

An example of this process will be described in detail with reference to FIG. 5.

Figure 5:
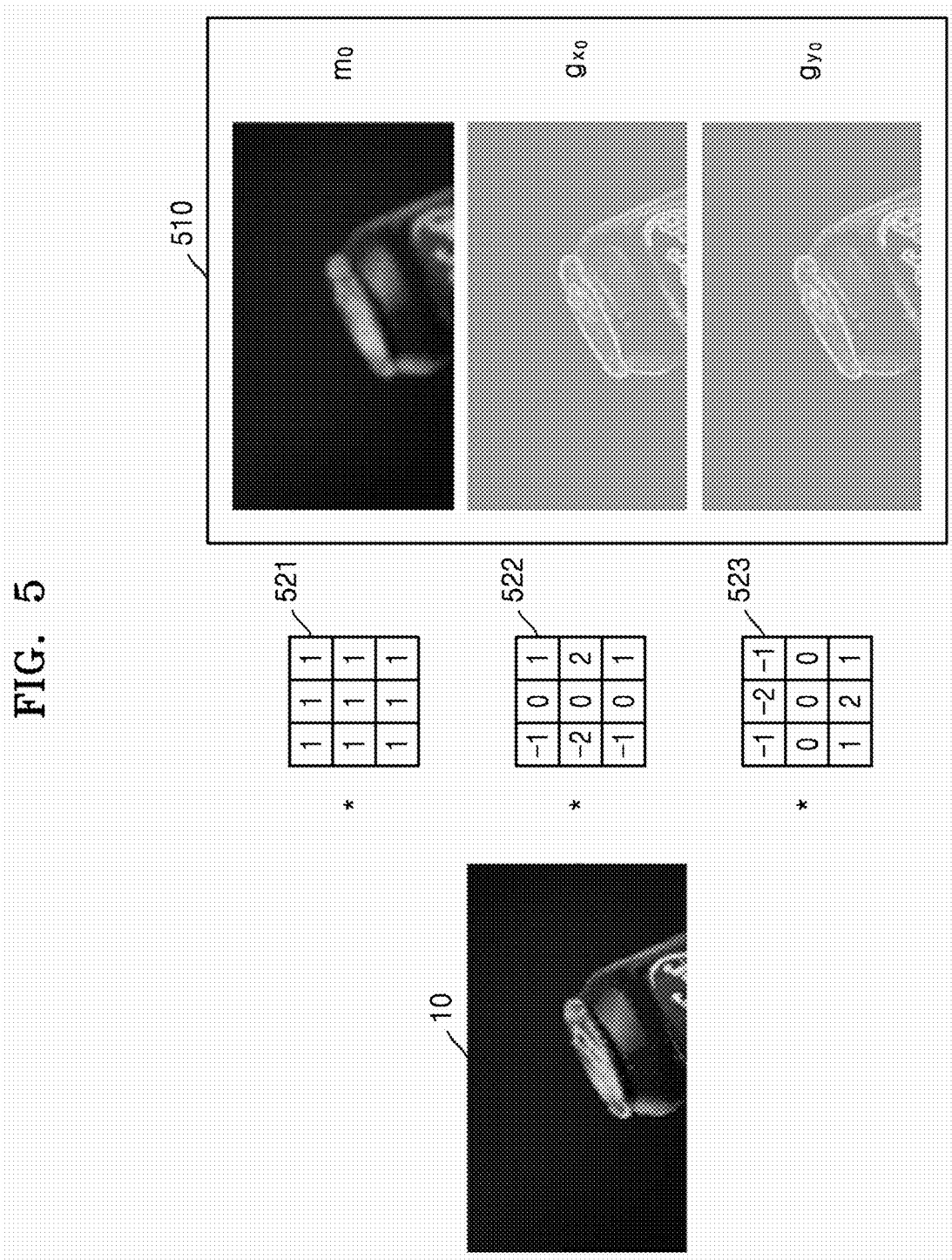
FIG. 5 is a diagram illustrating a method of obtaining initial values of estimated information regarding an original image, according to an embodiment.

FIG. 5 is a diagram illustrating a method of obtaining initial values of estimated information regarding an original image, according to an embodiment of the disclosure.

Referring to FIG. 5, the original image estimator 110 may obtain initial values 510 of the estimated information regarding the original image by performing filtering on the first image 10.

For example, the original image estimator 110 may obtain an initial value $m_0$ of an estimated pixel value of each pixel included in the original image by performing convolution by applying a first convolution filter 521 to the first image 10.

In addition, the original image estimator 110 may obtain an initial value $g_{x0}$ of a first estimated gradient value of each pixel included in the original image by performing convolution by applying a second convolution filter 522 to the first image 10.

Furthermore, the original image estimator 110 may obtain an initial value $g_{y0}$ of a second estimated gradient value of each pixel included in the original image by performing convolution by applying a third convolution filter 523 to the first image 10.

However, the method of obtaining initial values of estimated information regarding an original image illustrated in FIG. 5 is merely an example, and the original image estimator 110 may obtain initial values of estimated information regarding an original image by using various methods.

Referring again to FIG. 4, the original image estimator 110 may perform optimization on the estimated pixel value, the first estimated gradient value, and the second estimated gradient value, based on the initial values $m_0$, $g_{x0}$, and $g_{y0}$ of the estimated pixel value, the first estimated gradient value, and the second estimated gradient value, and the probability model described with reference to FIG. 3.

The original image estimator 110 may obtain estimated pixel values of respective pixels included in a first region 410 having a preset size around a first pixel $(x_0, y_0)$ included in the original image, based on an initial pixel value $m_0$, an initial x-direction gradient value $g_{x0}$ (i.e., an initial value of the first estimated gradient), and an initial y-direction gradient value $g_{y0}$ (i.e., an initial value of the second estimated gradient) of the first pixel $(x_0, y_0)$.

For example, the original image estimator 110 may compute an estimated pixel value m' of a second pixel (x, y) included in the first region 410 around the first pixel $(x_0, y_0)$, according to Equation 3.

$$m' = m0 + g_{x0}(x-x0) + g_{y0}(y-y0)$$ [Equation 3]

In Equation 3, $m_0$ denotes the initial pixel value of the first pixel $(x_0, y_0)$, $g_{x0}$ denotes the initial x-direction gradient value of the first pixel $(x_0, y_0)$, and $g_{y0}$ denotes the initial y-direction gradient value of the first pixel $(x_0, y_0)$.

The original image estimator 110 may obtain a difference between the estimated original image and the first image 10. For example, the original image estimator 110 may calculate a difference 430 between an estimated pixel value of each pixel included in the first region 410 of the estimated original image and a pixel value of each pixel included in a second region 420 of the first image 10. Here, the second region 420 is a partial region of the first image 10 and corresponds to the first region 410.

A probability $P(\{I\}_\Omega | m_0, g_{x_0}, g_{y_0})$ of the pixel values included in the second region 420 given that the pixel value, the first gradient value, and the second gradient value of the first pixel $(x_0, y_0)$ in the original image are $m_0$, $g_{x0}$, and $g_{y0}$, respectively, may be represented by Equation 4.

$$P(\{I\}_\Omega | m_0, g_{x_0}, g_{y_0}) = \qquad \text{[Equation 4]}$$
$$\prod_{(x,y)\in\Omega} P(I[x, y] | M(x, y) = m_0 + g_{x_0}(x - x_0) + g_{y_0}(y - y_0)) =$$
$$\prod_{(x,y)\in\Omega} \frac{1}{2}\left\{\Phi\left(\frac{\epsilon[x, y] + \gamma}{\sigma\sqrt{2}}\right) - \Phi\left(\frac{\epsilon[x, y] - \gamma}{\sigma\sqrt{2}}\right)\right\}$$

In addition, a loss function $L(m_0, g_{x_0}, g_{y_0})$ may be represented by Equation 5.

$$L(m_0, g_{x_0}, g_{y_0}) = -\log P(\{I\}_\Omega | m_0, g_{x_0}, g_{y_0}) = \qquad \text{[Equation 5]}$$
$$-\sum_{(x,y)\in\Omega} \log \frac{1}{2}\left\{\Phi\left(\frac{\epsilon[x, y] + \gamma}{\sigma\sqrt{2}}\right) - \Phi\left(\frac{\epsilon[x, y] - \gamma}{\sigma\sqrt{2}}\right)\right\}$$

The original image estimator 110 according to an embodiment of the disclosure may update the estimated pixel value, the first estimated gradient value, and the second estimated gradient value of the first pixel $(x_0, y_0)$ such that the loss function of Equation 5 decreases, in order to perform optimization on the estimated pixel value, the first estimated gradient value, and the second estimated gradient value of the first pixel $(x_0, y_0)$.

In addition, the original image estimator 110 may use gradient descent to find an estimated pixel value, a first estimated gradient value, and a second estimated gradient value that minimize the loss function. For example, the original image estimator 110 may determine the estimated pixel value, the first estimated gradient value, and the second estimated gradient value of each pixel that minimize the loss function, by subtracting, from their previous values, products of a preset learning rate and derivatives $\nabla L$ of the loss function, respectively.

Although only optimization of the first pixel $(x_0, y_0)$ is illustrated in and described with reference to FIG. 4, the original image estimator 110 may also perform optimization on remaining pixels included in the original image in the same manner as that used for the first pixel $(x_0, y_0)$, to obtain optimized values of the estimated pixel value, the first estimated gradient value, and the second estimated gradient value of each pixel.

Figure 6:
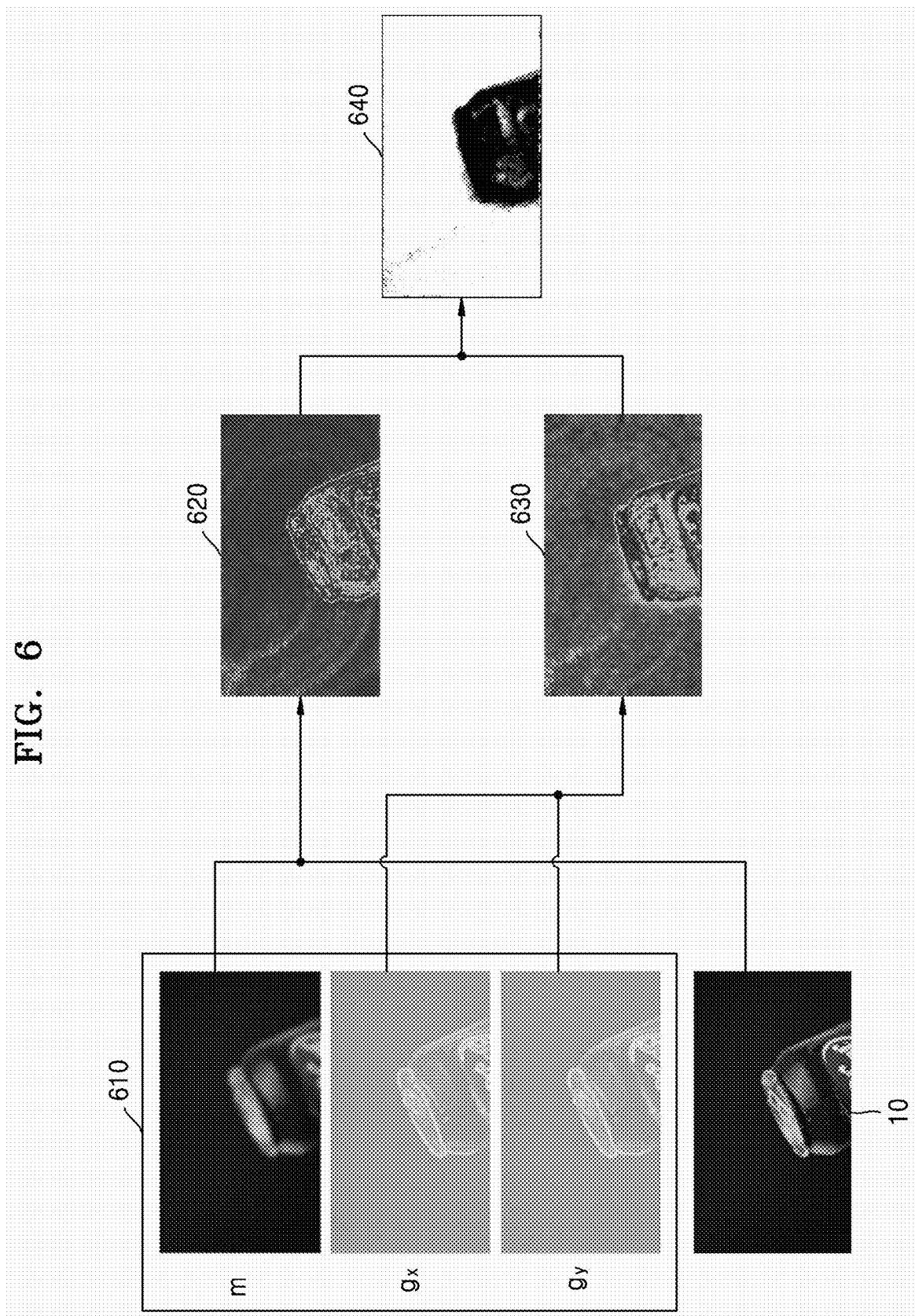
FIG. 6 is a diagram illustrating an operation of detecting a false contour, according to an embodiment.

FIG. 6 is a diagram illustrating an operation of detecting a false contour according to an embodiment of the disclosure.

Referring to FIG. 6, the false contour detector 120 may receive optimized estimated information 610 regarding an original image from the original image estimator 110. For example, the optimized estimated information 610 may include an estimated pixel value m, a first estimated gradient value $g_x$, and a second estimated gradient value $g_x$ of each pixel included in the original image.

The false contour detector 120 may generate a texture map 620 based on the estimated pixel values of the respectively pixels included in the original image and the pixel values included in the first image 10. For example, the false contour detector 120 may generate the texture map 620 by obtaining differences between the estimated pixel values of the pixels included in the original image and the pixel values included in the first image 10, respectively, and performing filtering on the differences. For example, the false contour detector 120 may calculate the absolute value of the difference of each pixel and use a median filter to calculate the median of the absolute values of respective pixels included in a window region having a preset size. In addition, the false contour detector 120 may transform result values obtained by applying the median filter, into values in the range of [0, 1] by using a transformation function, to generate the texture map 620. However, the disclosure is not limited thereto.

Here, the texture map 620 may represent a first weight of each pixel, and the first weights for pixels included in a texture region may be determined to be high, whereas the first weights for pixels included in a region other than the texture region may be determined to be low.

Also, the false contour detector 120 may generate a curvature map 630 based on the first gradient value $g_x$ and the second gradient value $g_y$ of each pixel included in the original image. For example, the false contour detector 120 may generate the curvature map 630 by computing Gaussian curvatures.

An example of this process will be described in detail with reference to FIG. 7.

Figure 7:
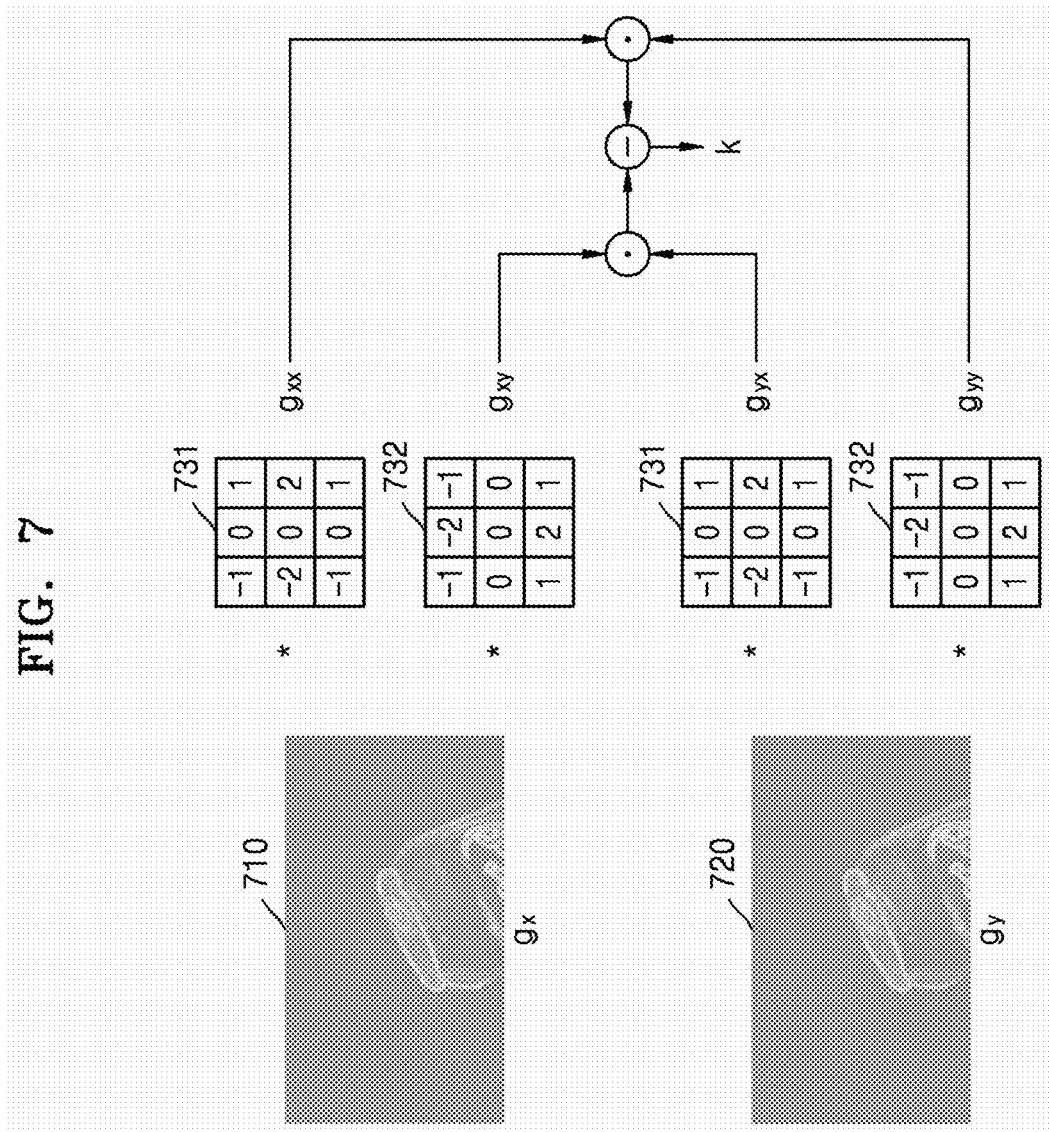
FIG. 7 is a diagram illustrating a method of generating a curvature map, according to an embodiment.

FIG. 7 is a diagram illustrating a method of generating a curvature map, according to an embodiment of the disclosure.

Referring to FIG. 7, the false contour detector 120 may compute a Gaussian curvature of each pixel by using the first gradient value $g_x$ and the second gradient value $g_x$ of each pixel included in the original image.

For example, the false contour detector 120 may perform convolution by applying a first filter 731 to first gradient values 710, which include each first gradient value $g_x$ of each pixel included in the original image, to obtain x-direction derivatives $g_{xx}$ of the first gradient values 710 of the respective pixels. In addition, the false contour detector 120 may perform convolution by applying a second filter 732 to the first gradient values 710, which include each first gradient value $g_x$ of each pixel included in the original image, to obtain y-direction derivatives $g_{xy}$ of the first gradient values 710 of the respective pixels.

In addition, the false contour detector 120 may perform convolution by applying the first filter 731 to second gradient values 720, which include each second gradient value $g_y$ of each pixel included in the original image, to obtain x-direction derivatives $g_{yx}$ of the second gradient values 720 of the respective pixels.

In addition, the false contour detector 120 may perform convolution by applying the second filter 732 to the second gradient values 720, which include each second gradient value $g_y$ of each pixel included in the original image, to obtain y-direction derivatives $g_{yy}$ of the second gradient values 720 of the respective pixels.

The false contour detector 120 may compute a Gaussian curvature $\kappa$ of each pixel by using Equation 6 and the obtained derivatives $g_{xx}$, $g_{xy}$, $g_{yx}$, and $g_{yy}$.

$$\kappa = g_{xx} * g_{yy} - g_{xy} * g_{yx} \qquad \text{[Equation 6]}$$

Here, as the Gaussian curvature $\kappa$ increases, the corresponding pixel region has more curves, and thus is likely to be a texture region.

Referring again to FIG. 6, the curvature map 630 may represent a second weight of each pixel, and a region with high second weights (i.e., high curvatures) may have a high degree of or amount of curve, whereas a region with low second weights (i.e., low curvatures) may have a low degree of or amount of curve.

The false contour detector 120 may generate a decontour map 640 based on the texture map 620 and the curvature map 630. The decontour map 640 may represent a third weight of each pixel, and the third weight may be determined based on the first weight of each pixel represented by the texture map 620 and the second weight of each pixel represented by the curvature map 630. For example, as the first weight and the second weight of each pixel increase, the third weight may decrease, and, as the first weight and the second weight of each pixel decrease, the third weight may increase. However, the disclosure is not limited thereto.

That is, a region with low third weights may be a texture region or a region including true contours, while a region with high third weights may be a region including false contours.

Figure 8:
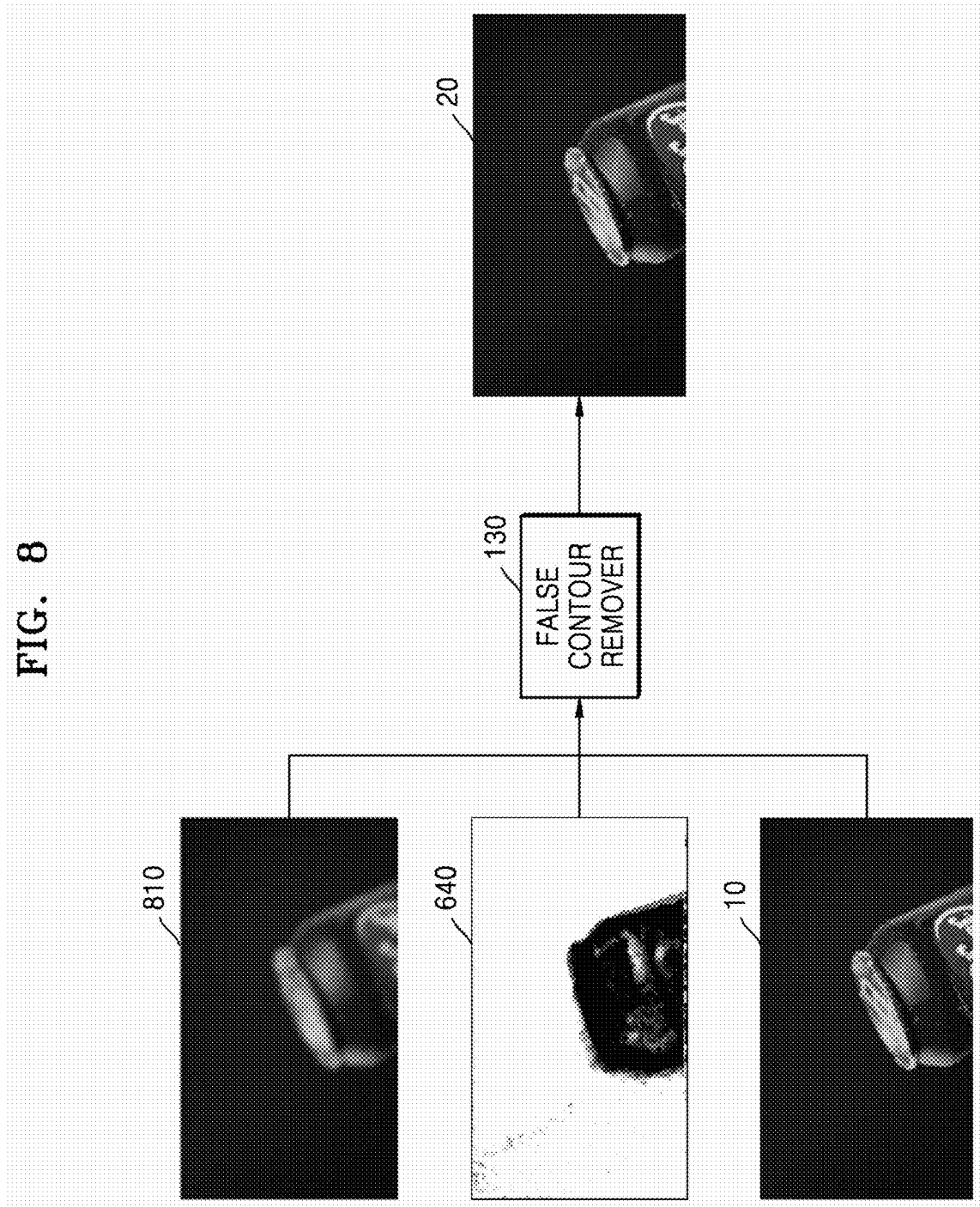
FIG. 8 is a diagram for describing a false contour removal operation according to an embodiment.

FIG. 8 is a diagram for describing a false contour removal operation according to an embodiment of the disclosure.

Referring to FIG. 8, the false contour remover 130 may receive the decontour map 640 from the false contour detector 120, and receive an estimated original image 810 from the original image estimator 110.

The false contour remover 130 may generate the second image 20 by combining the estimated original image 810 with the first image 10 based on the decontour map 640. For example, the false contour remover 130 may generate the second image 20 by applying, to the estimated original image 810, a third weight w3 of each pixel represented by the decontour map 640 and applying a weight of (1−w3) to each pixel of the first image 10 and then combining the estimated original image 810 with the first image 10. Here, the second image 20 may be an image from which false contours of the first image 10 are removed.

Meanwhile, the image processing apparatus according to an embodiment of the disclosure may also perform a process of removing false contours from a moving image including a plurality of frame images. For example, in the case of a moving image that does not require real-time image processing, the image processing apparatus 100 may perform the image processing illustrated in and described with reference to FIGS. 1 to 8, on each of the plurality of frame images included in the moving image, to remove the false contours included in the plurality of frame images.

Figure 9:
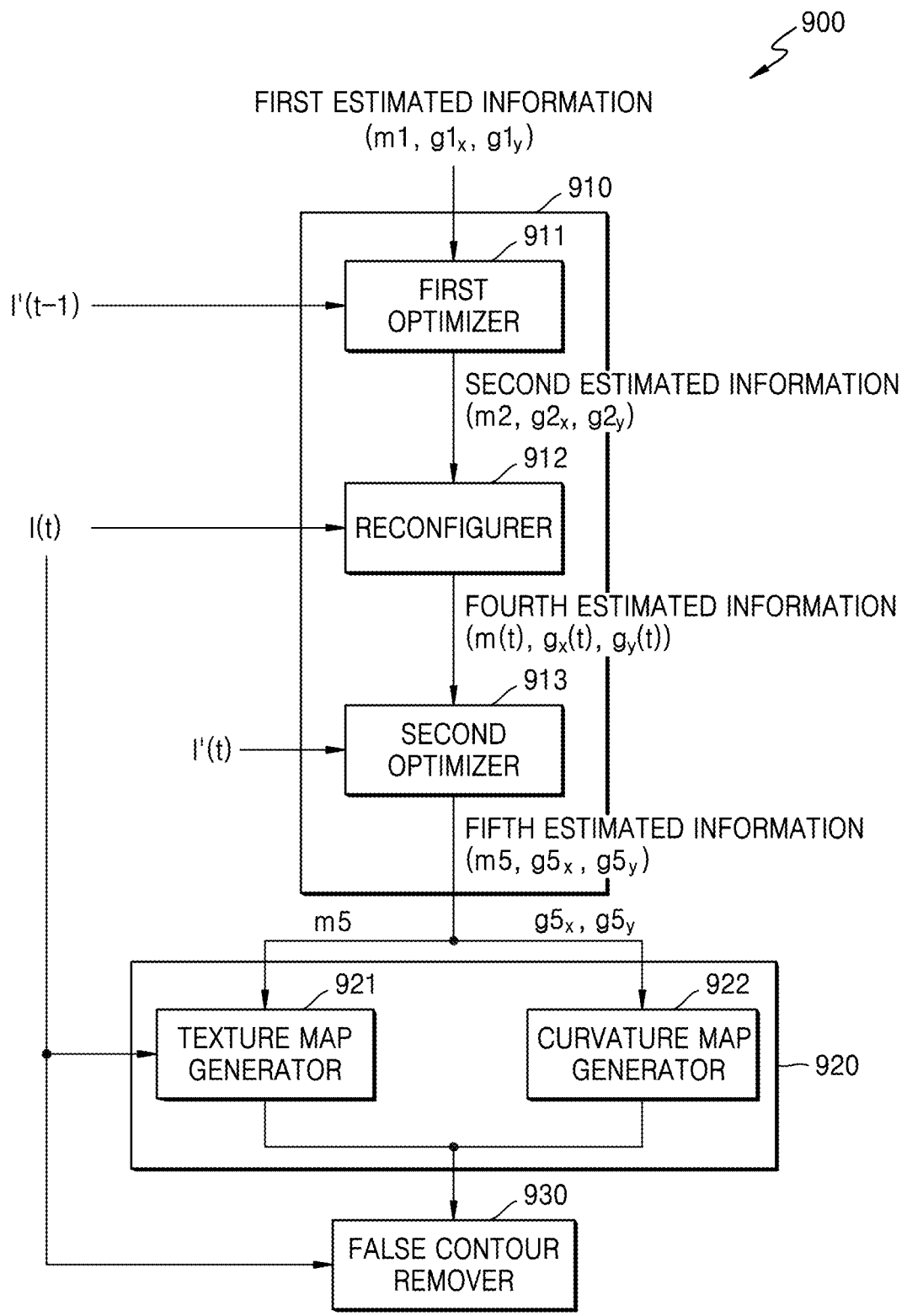
FIG. 9 is a block diagram of a configuration of an image processing apparatus according to another embodiment.

FIG. 9 is a block diagram of a configuration of an image processing apparatus 900 according to another embodiment of the disclosure.

The image processing apparatus 900 according to another embodiment of the disclosure may perform a false contour removal process on a moving image that requires real-time image processing. For example, the image processing apparatus may remove a false contour included in each of a plurality of frame images included in a real-time moving image.

Referring to FIG. 9, the image processing apparatus 900 may include an original image estimator 910, a false contour detector 920, and a false contour remover 930. In addition, the original image estimator 910 may include a first optimizer 911, a reconfigurer 912, and a second optimizer 913.

The first optimizer 911 may receive first estimated information (m1, g1$_x$, g1$_y$) obtained by subsampling estimated values of an original image, which are optimized with respect to a previous frame image I(t−1), and a subsampled previous frame image I'(t−1). The first optimizer 911 may perform optimization on first estimated values m1, g1$_x$, and g1$_y$ included in the first estimated information based on the first estimated information (m1, g1$_x$, g1$_y$) and the subsampled previous frame image I'(t−1). An example of a method of optimizing first estimated values has been described in detail with reference to FIG. 4, and thus detailed descriptions thereof will be omitted.

The first optimizer 911 may obtain optimized second estimated values m2, g2$_x$, and g2$_y$.

The reconfigurer 912 may receive second estimated information including the second estimated values m2, g2$_x$, and g2$_y$ obtained by the first optimizer 911, and reconfigure initial values of estimated information regarding an original image of a current frame image I(t) based on the second estimated information.

An example of a method, performed by the reconfigurer 912, of reconfiguring the initial values of the estimated information regarding the original image of the current frame image I(t) will be described in detail with reference to FIG. 10.

Figure 10:
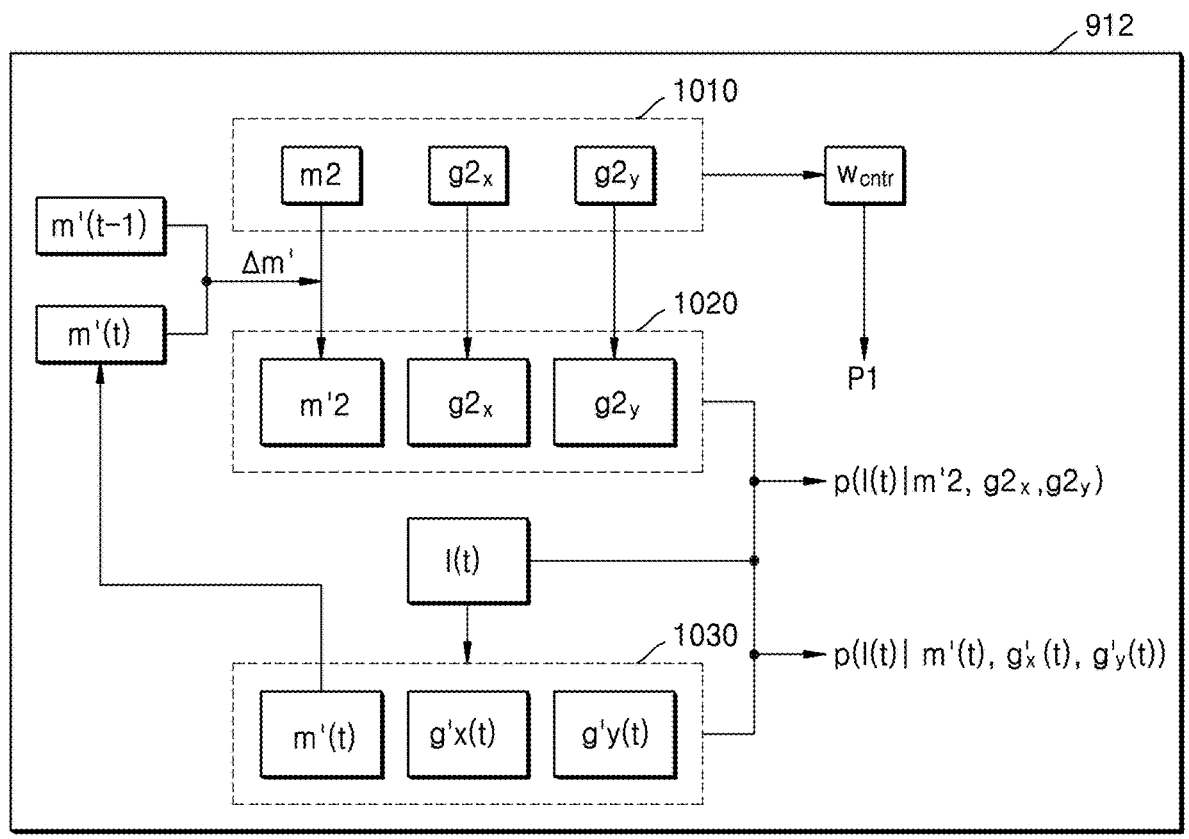
FIG. 10 is a diagram for describing a method, performed by a reconfigurer of FIG. 9, of reconfiguring initial values of estimated information regarding an original image of a current frame image, according to an embodiment.

FIG. 10 is a diagram for describing a method, performed by the reconfigurer 912 of FIG. 9, of reconfiguring initial values of estimated information regarding an original image of a current frame image.

Referring to FIG. 10, the reconfigurer 912 may obtain third estimated information 1020, which is a result of applying the amount of change between the previous frame image I(t−1) and the current frame image I(t) to second estimated information 1010 including second estimated values obtained by the first optimizer 911.

For example, the reconfigurer 912 may obtain difference information Δm' between initial estimated pixel values m'(t−1) of the original image of the previous frame image I(t−1) and initial estimated pixel values m'(t) of the original image of the current frame image I(t). Here, the initial estimated pixel values m'(t−1) of the original image of the previous frame image I(t−1) may be previously calculated and stored when processing the previous frame image I(t−1). Also, the initial estimated pixel values m'(t−1) of the original image of the previous frame image I(t−1) and the initial estimated pixel values m'(t) of the original image of the current frame image I(t) may be subsampled values. The reconfigurer 912 may obtain the third estimated information 1020 by applying the difference information Δm' to the second estimated information 1010.

In addition, the reconfigurer 912 may obtain, based on the current frame image I(t), initial values 1030 including m'(t), g'$_x$(t), and g'$_y$(t) of estimated information regarding the original image of the current frame image I(t). The reconfigurer 912 may perform filtering on the current frame image I(t) to obtain the initial values 1030 including m'(t), g'$_x$(t), and g'$_y$(t) of the estimated information regarding the original image. An example of a method of obtaining initial values of estimated information regarding an original image has been described in detail with reference to FIG. 5, and thus detailed descriptions thereof will be omitted.

The reconfigurer 912 may determine a weight w based on a probability p(I(t)|m'2, g2$_x$, g2$_y$) of the current frame image I(t) originating from an original image having the third estimated information 1020, a probability p(I(t)|m'(t), g'$_x$(t), g'$_y$(t)) of the current frame image I(t) originating from the initial values 1030 including m'(t), g'$_x$(t), and g'$_y$(t) of the estimated information regarding the original image of the current frame image I(t), and a probability p1 of a false contour existing in the previous frame image.

Here, the probability p(I(t)|m'2, g2$_x$, g2$_y$) and the probability p(I(t)|m'(t), g'$_x$(t), g'$_y$(t)) may be represented by Equations 7 and 8, respectively.

$$p(I(t)|m'2,g2x,g2y)=\exp(-L(m'2,g2x,g2y;I(t))) \quad \text{[Equation 7]}$$

$$p(I(t)|m'(t),g'x(t),g'y(t))=\exp(-L(m'(t),g'x(t),g'y(t);I(t))) \quad \text{[Equation 8]}$$

The reconfigurer 912 may compute the weight w by using Equation 9.

$$w = p(m(t), gx(t), gy(t)|I(t)) = \frac{\exp\left(-\frac{L(m'2, g2x, g2y; I(t))}{T}\right) * p1}{\exp\left(-\frac{L(m', g2x, g2y; I(t))}{T}\right) * p1 +} \\ \exp\left(-\frac{L(m'(t), g'x(t), g'y(t); I(t))}{T}\right) * (1 - p1)$$

[Equation 9]

Here, the probability p1 of a false contour existing in the previous frame image may be determined based on the second estimated information 1010. For example, the reconfigurer 912 may compute a Gaussian curvature $W_{cntr}$ of each pixel by using the estimated gradient values included in the second estimated information 1010. An example of a method of computing the Gaussian curvature $W_{cntr}$ of each pixel is illustrated in and described with reference to FIG. 7, and thus detailed descriptions thereof will be omitted.

The reconfigurer 912 may obtain the probability p1 by applying a transformation function to the Gaussian curvature $W_{cntr}$ of each pixel to map the Gaussian curvature $W_{cntr}$ of each pixel to a value between 0 and 1. For example, when the Gaussian curvature $W_{cntr}$ is 3 or greater, p1 may be mapped to 0, when the Gaussian curvature $W_{cntr}$ is 1.5 or less, p1 may be mapped to 1, and when the Gaussian curvature $W_{cntr}$ is greater than 1.5 and less than 3, p1 may be mapped to a value between 0 and 1, and p1 may be linearly mapped to decrease as the Gaussian curvature $W_{cntr}$ increases. However, a method of obtaining the probability p1 is not limited thereto, and the probability p1 may be obtained by using other methods.

When the weight w is determined, the reconfigurer 912 may obtain fourth estimated information (m(t), $g_x$(t), $g_y$(t)) by using Equation 8.

$$(m(t), gx(t), gy(t)) = w*(mV), g'x(t), g'y(t)) + (1-w)*(m'2, g2x, g2y) \qquad \text{[Equation 10]}$$

In Equation 10, (m'2, $g2_x$, $g2_y$) denotes the third estimated information 1020, (m'(t), $g_x'$(t), $g_y'$(t)) denotes the initial values of the estimated information regarding the original image of the current frame image, and w denotes a weight computed by using Equation 9.

Referring again to FIG. 9, the second optimizer 913 may upscale the fourth estimated information (m(t), $g_x$(t), $g_y$(t)) obtained by the reconfigurer 912, and obtain fifth estimated values by performing optimization on fourth estimated values m(t), $g_x$(t), and $g_y$(t) included in the upscaled fourth estimated information by using the subsampled current frame image I'(t). An example of a method of optimizing fourth estimated values has been described in detail with reference to FIG. 4, and thus detailed descriptions thereof will be omitted.

The false contour detector 920 may detect a false contour included in the current frame image based on fifth estimated information including fifth estimated values m5, $g5_x$, and $g5_y$ obtained by the second optimizer 913.

For example, the false contour detector 920 may include a texture map generator 921, which may upscale the estimated values m5 of the respective pixels included in the fifth estimated information, and generate a texture map based on the upscaled estimated values m5 of the respective pixels and the current frame image I(t). An example of a method of generating a texture map has been described in detail with reference to FIG. 6, and thus a detailed description thereof will be omitted.

The false contour detector 920 may also include a curvature map generator 922, which may generate a curvature map based on first and second gradient values $g5_x$ and $g5_x$ of each pixel included in the fifth estimated information. An example of a method of generating a curvature map has been described in detail with reference to FIGS. 6 and 7, and thus detailed descriptions thereof will be omitted.

The false contour remover 930 may upscale the curvature map generated by the curvature map generator 922, and generate a decontour map based on the upscaled curvature map and the texture map generated by the texture map generator 921. An example of a method of generating a decontour map has been described in detail with reference to FIG. 8, and thus a detailed description thereof will be omitted.

The false contour remover 930 may generate a reconstructed image by combining the current frame image I(t) with the upscaled estimated values m5 of the respective pixels, based on the decontour map. An example of a method of generating a reconstructed image from which false contours are removed has been described in detail with reference to FIG. 8, and thus detailed descriptions thereof will be omitted.

Figure 11:
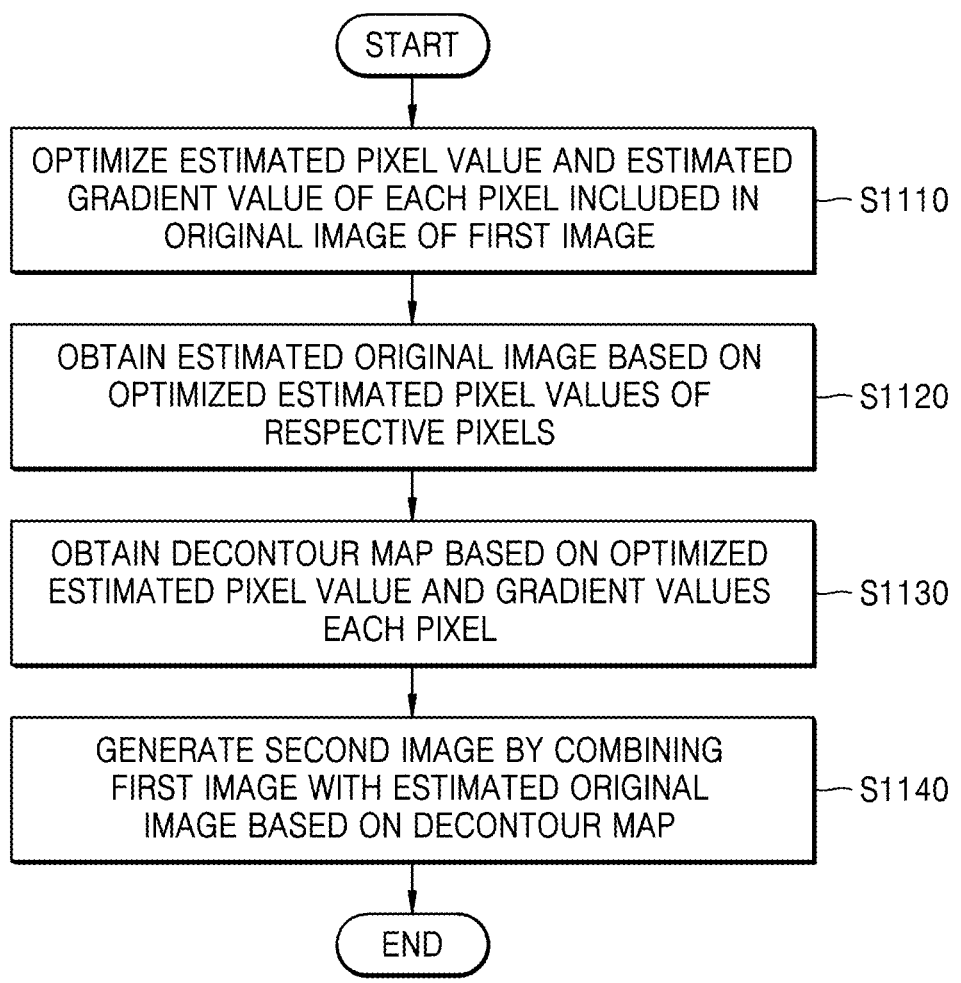
FIG. 11 is a flowchart of a method of operating an image processing apparatus according to an embodiment.

FIG. 11 is a flowchart of a method of operating an image processing apparatus according to an embodiment of the disclosure.

Referring to FIG. 11, the image processing apparatus 100 according to an embodiment of the disclosure may optimize an estimated pixel value and an estimated gradient value of each pixel included in an original image of a first image at operation S1110.

The image processing apparatus 100 may obtain initial values of the estimated pixel value and the estimated gradient values of each pixel included in the original image of the first image. For example, the image processing apparatus 100 may perform filtering on the first image to obtain initial values $m_0$, $g_{x0}$, and $g_{y0}$ of the estimated pixel value, the first estimated gradient value, and the second estimated gradient value of each pixel included in the original image. An example of this has been described in detail with reference to FIG. 5, and thus a detailed description thereof will be omitted.

The image processing apparatus 100 may perform optimization on the estimated pixel value, the first estimated gradient value, and the second estimated gradient value, based on the initial values $m_0$, $g_{x0}$, and $g_{y0}$ of the estimated pixel value, the first estimated gradient value, and the second estimated gradient value, and the Bayes' rule-based probability model described with reference to FIG. 3.

The Bayes' rule-based probability model according to an embodiment of the disclosure may be obtained by modeling a probability that a pixel value of each pixel included in a first region around a first pixel in a first image originates from a first pixel of an original image having an estimated pixel value, a first estimated gradient value, and a second estimated gradient value.

The image processing apparatus 100 may optimize the estimated pixel value, the first estimated gradient value, and the second estimated gradient value of the first pixel by updating the estimated pixel value, the first estimated gradient value, and the second estimated gradient value of the first pixel such that the probability increases.

The image processing apparatus 100 may obtain pixel values of pixels included in a second region around the first pixel in the original image, based on the estimated pixel value and the estimated gradient values of the first pixel.

A loss function may be determined based on a probability that a pixel value of each pixel included in the first region of the first image originates from a pixel value of each pixel included in the second region of the original image. Here, the probability and the loss function may be represented by a function of a difference between a pixel value of each pixel included in the second region of the original image and a pixel value of each pixel included in the first region of the first image.

The image processing apparatus 100 may optimize the estimated pixel value, the first estimated gradient value, and the second estimated gradient value of the first pixel by updating the estimated pixel value, the first estimated gradient value, and the second estimated gradient value of the first pixel such that the loss function is minimized.

In addition, the image processing apparatus 100 may perform optimization on the remaining pixels included in the original image in the same manner as that used for the first pixel, to obtain optimized values of the estimated pixel value, the first estimated gradient value, and the second estimated gradient value of each pixel included in the original image.

The image processing apparatus 100 according to an embodiment of the disclosure may obtain an estimated original image based on the optimized estimated pixel values of the respective pixels at operation S1120.

For example, the estimated original image may refer to an image, the pixel values of the pixels of which are the estimated pixel values, respectively.

The image processing apparatus 100 according to an embodiment of the disclosure may obtain a decontour map based on the optimized estimated pixel value and gradient values of each pixel at operation S1130.

The image processing apparatus 100 may generate a texture map based on the estimated pixel values of the respective pixels included in the original image and the pixel values included in the first image. For example, the image processing apparatus 100 may generate the texture map by obtaining differences between the estimated pixel values of the pixels included in the original image and the pixel values included in the first image, respectively, and performing filtering on the differences. Here, the texture map may represent a first weight of each pixel, and the first weights for pixels included in a texture region may be determined to be high, whereas the first weights for pixels included in a region other than the texture region may be determined to be low.

Also, the image processing apparatus 100 may generate a curvature map based on the first gradient value and the second gradient value of each pixel included in the original image. For example, the image processing apparatus 100 may generate the curvature map by computing Gaussian curvatures. An example of a method of generating a curvature map has been described in detail with reference to FIG. 7, and thus detailed descriptions thereof will be omitted.

Here, the curvature map may represent a second weight of each pixel, and a region with high second weights (i.e., high curvatures) may have a high degree of or amount of curve, whereas a region with low second weights (i.e., low curvatures) may have a low degree of or amount of curve.

The image processing apparatus 100 may generate a decontour map based on the texture map and the curvature map. The decontour map may represent a third weight of each pixel, and the third weight may be determined based on the first weight of each pixel represented by the texture map and the second weight of each pixel represented by the curvature map. For example, as the first weight and the second weight of each pixel increase, the third weight may decrease, and, as the first weight and the second weight of each pixel decrease, the third weight may increase. However, the disclosure is not limited thereto.

In embodiments, a region with low third weights may be a texture region or a region including true contours, while a region with high third weights may be a region including false contours.

The image processing apparatus 100 according to an embodiment of the disclosure may generate a second image by combining the first image with the estimated original image based on the decontour map at operation S1140.

The image processing apparatus 100 may generate the second image by applying, to the estimated original image, the third weight of each pixel represented by the decontour map, applying (1 – third weight) to the first image, and then combining the first image with the estimated original image. Here, the second image may be an image from which false contours of the first image are removed.

Figure 12:
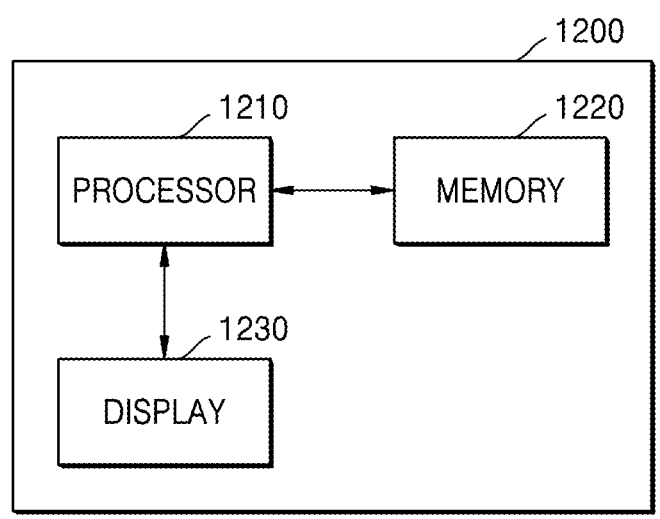
FIG. 12 is a block diagram of a configuration of an image processing apparatus according to an embodiment.

FIG. 12 is a block diagram of a configuration of an image processing apparatus 1200 according to an embodiment of the disclosure.

Referring to FIG. 12, the image processing apparatus 1200 may include a processor 1210, a memory 1220, and a display 1230.

The image processing apparatus 1200 illustrated FIG. 12 may correspond to the image processing apparatus 100 illustrated in and described with reference to FIGS. 1 to 8 or the image processing apparatus 900 illustrated in and described with reference to FIGS. 9 and 10.

The processor 1210 according to an embodiment of the disclosure may control the overall operation of the image processing apparatus 1200. The processor 1210 according to an embodiment of the disclosure may execute one or more programs stored in the memory 1220.

The memory 1220 according to an embodiment of the disclosure may store various types of data, programs, or applications for driving and controlling the image processing apparatus 1200. The program stored in the memory 1220 may include one or more instructions. The program (i.e., one or more instructions) or application stored in the memory 1220 may be executed by the processor 1210.

The processor 1210 according to an embodiment of the disclosure may include at least one of a central processing unit (CPU), a graphics processing unit (GPU), or a video processing unit (VPU). Alternatively, according to an embodiment of the disclosure, the processor 1210 may be implemented as a system-on-a-chip (SoC) into which at least one of a CPU, a GPU, or a VPU. In embodiments, the processor 1210 may further include a neural processing unit (NPU).

The processor 1210 according to an embodiment of the disclosure may optimize estimated information regarding an original image of a first image based on a probability model to obtain optimized estimated information, detect a false contour included in the first image based on the optimized estimated information and the first image, and obtain a second image from which the detected false contour is removed.

For example, the processor 1210 may perform at least one of the operations of the original image estimator 110, the false contour detector 120, or the false contour remover 130 illustrated in and described with reference to FIGS. 1 to 8. In addition, the processor 1210 may perform at least one of the operations of the first optimizer 911, the reconfigurer 912, the second optimizer 913, the texture map generator 921, the curvature map generator 922, and the false contour remover 930 illustrated in and described with reference to FIGS. 9 and 10.

The processor 1210 may obtain initial values of the estimated pixel value and the estimated gradient values of each pixel included in the original image of the first image. For example, the processor 1210 may perform filtering on the first image to obtain initial values $m_0$, $g_{x0}$, and $g_{y0}$ of the estimated pixel value, the first estimated gradient value, and the second estimated gradient value of each pixel included in the original image. An example of this has been described in detail with reference to FIG. 5, and thus detailed descriptions thereof will be omitted.

The processor 1210 may perform optimization on the estimated pixel value, the first estimated gradient value, and the second estimated gradient value, based on the initial values $m_0$, $g_{x0}$, and $g_{y0}$ of the estimated pixel value, the first estimated gradient value, and the second estimated gradient value, and the Bayes' rule-based probability model described with reference to FIG. 3.

The Bayes' rule-based probability model according to an embodiment of the disclosure may be obtained by modeling a probability that a pixel value of each pixel included in a first region around a first pixel in a first image originates from a first pixel of an original image having an estimated pixel value, a first estimated gradient value, and a second estimated gradient value.

The processor 1210 may optimize the estimated pixel value, the first estimated gradient value, and the second estimated gradient value of the first pixel by updating the estimated pixel value, the first estimated gradient value, and the second estimated gradient value of the first pixel such that the probability increases.

The processor 1210 may obtain pixel values of pixels included in a second region around the first pixel in the original image, based on the estimated pixel value and the estimated gradient values of the first pixel.

A loss function may be determined based on a probability that a pixel value of each pixel included in the first region of the first image originates from a pixel value of each pixel included in the second region of the original image. Here, the probability and the loss function may be represented by a function of a difference between a pixel value of each pixel included in the second region of the original image and a pixel value of each pixel included in the first region of the first image.

The processor 1210 may optimize the estimated pixel value, the first estimated gradient value, and the second estimated gradient value of the first pixel by updating the estimated pixel value, the first estimated gradient value, and the second estimated gradient value of the first pixel such that the loss function is minimized.

In addition, the processor 1210 may perform optimization on the remaining pixels included in the original image in the same manner as that used for the first pixel, to obtain optimized values of the estimated pixel value, the first estimated gradient value, and the second estimated gradient value of each pixel included in the original image.

The processor 1210 may obtain an estimated original image based on the optimized estimated pixel values of the respective pixels.

The processor 1210 may generate a texture map based on the estimated pixel values of the respective pixels included in the original image and the pixel values included in the first image. For example, the processor 1210 may generate the texture map by obtaining differences between the estimated pixel values of the pixels included in the original image and the pixel values included in the first image, respectively, and performing filtering on the differences. Here, the texture map may represent a first weight of each pixel, and the first weights for pixels included in a texture region may be determined to be high, whereas the first weights for pixels included in a region other than the texture region may be determined to be low.

Also, the processor 1210 may generate a curvature map based on the first gradient value and the second gradient value of each pixel included in the original image. For example, the processor 1210 may generate the curvature map by computing Gaussian curvatures. An example of a method of generating a curvature map has been described in detail with reference to FIG. 7, and thus detailed descriptions thereof will be omitted.

Here, the curvature map may represent a second weight of each pixel, and a region with high second weights (i.e., high curvatures) may have a high degree of or amount of curve, whereas a region with low second weights (i.e., low curvatures) may have a low degree of or amount of curve.

The processor 1210 may generate a decontour map based on the texture map and the curvature map. The decontour map may represent a third weight of each pixel, and the third weight may be determined based on the first weight of each pixel represented by the texture map and the second weight of each pixel represented by the curvature map.

The processor 1210 may generate the second image by applying, to the estimated original image, the third weight of each pixel represented by the decontour map, applying (1−third weight) to the first image, and then combining the first image with the estimated original image. Here, the second image may be an image from which false contours of the first image are removed.

The display 1230 according to an embodiment of the disclosure converts an image signal, a data signal, an on-screen display (OSD) signal, a control signal, or the like, that has been processed by the processor 1210, to generate a driving signal. The display 1230 may be implemented as a plasma display panel (PDP), a liquid-crystal display (LCD), an organic light-emitting diode (OLED), a flexible display, or a three-dimensional (3D) display. Also, the display 1230 may be configured as a touch screen to be used as both an output device and an input device.

The display 1230 according to an embodiment of the disclosure may display the second image from which the false contour is removed.

The block diagram of the image processing apparatus 1200 illustrated in FIG. 12 is merely an example, and embodiments are not limited thereto. Each of the components illustrated in the block diagram may be integrated, added, or omitted according to embodiments. That is, two or more components may be integrated into one component, or one component may be divided into two or more components, as necessary. Also, a function performed by each block is for describing embodiments of the disclosure, and its detailed operation or device does not limit the scope of the disclosure.

An operating method of an image processing apparatus according to an embodiment of the disclosure may be embodied as program instructions executable by various computer devices, and recorded on a computer-readable medium. The computer-readable medium may include program instructions, data files, data structures, or the like separately or in combinations. The program instructions to be recorded on the medium may be specially designed and configured for the disclosure or may be well-known to and be usable by one of ordinary skill in the art of computer software. Examples of the computer-readable recording medium include magnetic media such as hard disks, floppy disks, or magnetic tapes, optical media such as compact disc read-only memories (CD-ROMs) or digital video discs (DVDs), magneto-optical media such as floptical disks, and hardware devices such as read-only memory (ROM), random-access memory (RAM), and flash memory, which are specially configured to store and execute program instructions. Examples of the program instructions include not only machine code, such as code made by a compiler, but also high-level language code that is executable by a computer by using an interpreter or the like.

In addition, the image processing apparatus and the operating method of the image processing apparatus according to embodiments of the disclosure may be included in a computer program product to be provided. The computer program product may be traded between a seller and a purchaser as a commodity.

The computer program product may include a software (S/W) program and a computer-readable recording medium storing the S/W program. For example, the computer program product may include a product in the form of a software program electronically distributed (e.g., a downloadable application) through a manufacturer of an electronic device or an electronic market (e.g., Google Play Store, App Store). For electronic distribution, at least part of the S/W program may be stored in a storage medium or temporarily generated. In embodiments, the storage medium may be a storage medium of a server of the manufacturer or a server of the electronic market, or a relay server that temporarily stores the SAN program.

The computer program product may include a storage medium of a server or a storage medium of a client device, in a system including the server and the client device. In embodiments, when there is a third device (e.g., a smart phone) communicatively connected to the server or the client device, the computer program product may include a storage medium of the third device. In embodiments, the computer program product may include the SAN program itself, which is transmitted from the server to the client device or the third device or transmitted from the third device to the client device.

In embodiments, one of the server, the client device, and the third device may execute the computer program product to perform the method according to the embodiments of the disclosure. In embodiments, two or more of the server, the client device, and the third device may execute the computer program product to execute the method according to the embodiments of the disclosure in a distributed manner.

For example, the server (e.g., a cloud server, an artificial intelligence server) may execute the computer program product stored in the server to control the client device communicatively connected to the server to perform the method according to the embodiments of the disclosure.

Although embodiments have been described above in detail, the scope of the disclosure is not limited thereto, and various modifications and alterations by one of ordinary skill in the art using the basic concept of the disclosure defined in the following claims also fall within the scope of the disclosure.

What is claimed is:

1. An image processing apparatus comprising:
a memory configured to store one or more instructions; and
at least one processor configured to execute the one or more instructions to:
based on a first image and a probability model, optimize an estimated pixel value and estimated gradient values of each pixel of an original image corresponding to the first image,
obtain an estimated original image based on the optimized estimated pixel value of the each pixel of the original image,
obtain a decontour map based on the optimized estimated pixel value and the estimated gradient values of the each pixel of the original image, and
generate a second image by combining the first image with the estimated original image based on the decontour map.

2. The image processing apparatus of claim 1, wherein the first image includes a true contour which is included in the original image, and a false contour which is not included in the original image, and
wherein the second image is an image from which the false contour is removed.

3. The image processing apparatus of claim 1, wherein the at least one processor is further configured to execute the one or more instructions to:
obtain, based on the first image, initial values of the estimated pixel value and the estimated gradient values of the each pixel of the original image, and
optimize the estimated pixel value and the estimated gradient values of the each pixel of the original image by updating the estimated pixel value and the estimated gradient values of the each pixel of the original image based on the probability model.

4. The image processing apparatus of claim 3, wherein the probability model is obtained by modeling a probability that a pixel value of each pixel included in a first region around a first pixel of the first image originates from a first pixel of the original image having the estimated pixel value and the estimated gradient values, and
wherein the at least one processor is further configured to execute the one or more instructions to optimize the estimated pixel value and the estimated gradient values of the first pixel by updating the estimated pixel value and the estimated gradient values of the first pixel such that the probability increases.

5. The image processing apparatus of claim 4, wherein the at least one processor is further configured to execute the one or more instructions to:
obtain pixel values of pixels included in a second region around the first pixel in the original image, based on the estimated pixel value and the estimated gradient values of the first pixel, and
optimize the estimated pixel value and the estimated gradient values of the first pixel by updating the estimated pixel value and the estimated gradient values of the first pixel such that a loss function determined based on the probability is minimized, and
wherein the probability is represented by a function of a difference between a pixel value of each pixel included in the second region and a pixel value of the each pixel included in the first region.

6. The image processing apparatus of claim 1, wherein the at least one processor is further configured to execute the one or more instructions to:
obtain a texture map based on the first image and the estimated original image,
obtain a curvature map based on the optimized estimated gradient values of the each pixel of the original image, and obtain the decontour map based on the texture map and the curvature map.

7. The image processing apparatus of claim 6, wherein the at least one processor is further configured to execute the one or more instructions to generate the texture map by obtaining a difference image between the first image and the estimated original image and performing filtering on the difference image.

8. The image processing apparatus of claim 6, wherein the at least one processor is further configured to execute the one or more instructions to obtain the curvature map by computing a curvature of each pixel of the estimated original image based on the optimized estimated gradient values of the each pixel of the original image.

9. The image processing apparatus of claim 6, wherein the texture map represents a first weight of the each pixel of the original image,
wherein the curvature map represents a second weight of the each pixel of the original image,
wherein the decontour map represents a third weight of the each pixel of the original image, and
wherein the at least one processor is further configured to execute the one or more instructions to obtain the third weight based on the first weight and the second weight of the each pixel of the original image.

10. The image processing apparatus of claim 1, wherein the at least one processor is further configured to execute the one or more instructions to:
receive a third image comprising a frame image subsequent to the first image,
obtain first estimated information including the estimated pixel value and the estimated gradient values of the each pixel of the original image, which are optimized and subsampled with respect to the first image,
obtain second estimated information by subsampling initial values of an estimated pixel value and estimated gradient values of each pixel of the third image,
obtain difference information between the first image and the third image,
obtain third estimated information based on the first estimated information and the difference information,
obtain fourth estimated information by combining the second estimated information with the third estimated information based on a first probability that the third image originates from the second estimated information and a second probability that the third image originates from the third estimated information,
obtain fifth estimated information by performing optimization on the fourth estimated information based on the subsampled third image, and
generate a fourth image from which a false contour of the third image is removed, based on an estimated pixel value and estimated gradient values included in the fifth estimated information.

11. The image processing apparatus of claim 10, wherein the at least one processor is further configured to execute the one or more instructions to:
obtain a third probability that a false contour of the first image is included in each pixel of the first image, and
obtain the fourth estimated information by combining the second estimated information and the third estimated information based on the first probability, the second probability, and the third probability.

12. The image processing apparatus of claim 10, wherein the at least one processor is further configured to execute the one or more instructions to:

obtain an estimated original image of the third image by upscaling the estimated pixel value included in the fifth estimated information,
obtain a texture map based on the third image and the estimated original image of the third image,
obtain a curvature map based on the estimated gradient values included in the fifth estimated information,
upscale the curvature map,
generate a decontour map of the third image based on the texture map and the upscaled curvature map, and
generate the fourth image based on the decontour map of the third image.

13. An operating method of an image processing apparatus, the operating method comprising:
based on a first image and a probability model, optimizing an estimated pixel value and estimated gradient values of each pixel of an original image corresponding to the first image;
obtaining an estimated original image based on the optimized estimated pixel value of the each pixel of the original image;
obtaining a decontour map based on the optimized estimated pixel value and the estimated gradient values of the each pixel of the original image; and
generating a second image by combining the first image with the estimated original image based on the decontour map.

14. The operating method of claim 13, wherein the first image includes a true contour which is included in the original image, and a false contour which is not included in the original image, and
wherein the second image is an image from which the false contour is removed.

15. The operating method of claim 13, wherein the optimizing, based on the first image and the probability model, of the estimated pixel value and the estimated gradient values of the each pixel of the original image comprises:
obtaining, based on the first image, initial values of the estimated pixel value and the estimated gradient values of the each pixel of the original image; and
optimizing the estimated pixel value and the estimated gradient values of the each pixel of the original image by updating the estimated pixel value and the estimated gradient values of the each pixel of the original image based on the probability model.

16. The operating method of claim 15, wherein the probability model is obtained by modeling a probability that a pixel value of each pixel included in a first region around a first pixel of the first image originates from a first pixel of the original image having the estimated pixel value and the estimated gradient values, and
wherein the optimizing of the estimated pixel value and the estimated gradient values of the each pixel of the original image comprises optimizing the estimated pixel value and the estimated gradient values of the first pixel by updating the estimated pixel value and the estimated gradient values of the first pixel such that the probability increases.

17. The operating method of claim 16, wherein the optimizing of the estimated pixel value and the estimated gradient values of the each pixel of the original image comprises:
obtaining pixel values of pixels included in a second region around the first pixel in the original image, based on the estimated pixel value and the estimated gradient values of the first pixel; and optimizing the estimated pixel value and the estimated gradient values of the first pixel by updating the estimated pixel value and the estimated gradient values of the first pixel such that a loss function determined based on the probability is minimized, and wherein the probability is represented by a function of a difference between a pixel value of each pixel included in the second region and a pixel value of the each pixel included in the first region.

18. The operating method of claim 13, wherein the obtaining of the decontour map comprises:

obtaining a texture map based on the first image and the estimated original image;

obtaining a curvature map based on the optimized estimated gradient values of the each pixel of the original image; and obtaining the decontour map based on the texture map and the curvature map.

19. The operating method of claim 18, wherein the obtaining of the texture map comprises:

obtaining a difference image between the first image and the estimated original image; and generating the texture map by performing filtering on the difference image.

20. A non-transitory computer-readable recording medium configured to store instructions which, when executed by at least one processor, cause the at least one processor to:

based on a first image and a probability model, optimize an estimated pixel value and estimated gradient values of each pixel of an original image corresponding to the first image;

obtain an estimated original image based on the optimized estimated pixel value of the each pixel of the original image;

obtain a decontour map based on the optimized estimated pixel value and the estimated gradient values of the each pixel of the original image; and generate a second image by combining the first image with the estimated original image based on the decontour map.

* * * * *